United States Patent
Tsunemi et al.

(10) Patent No.: US 8,225,418 B2
(45) Date of Patent: Jul. 17, 2012

(54) METHOD FOR PROCESSING OUTPUT OF SCANNING TYPE PROBE MICROSCOPE, AND SCANNING TYPE PROBE MICROSCOPE

(75) Inventors: Eika Tsunemi, Kyoto (JP); Nobuo Satoh, Kyoto (JP); Kei Kobayashi, Kyoto (JP); Hirofumi Yamada, Kyoto (JP); Kazumi Matsushige, Kyoto (JP)

(73) Assignee: Kyoto University, Kyoto-shi (JP)

( * ) Notice: Subject to any disclaimer, the term of this patent is extended or adjusted under 35 U.S.C. 154(b) by 0 days.

(21) Appl. No.: 13/133,595

(22) PCT Filed: Dec. 7, 2009

(86) PCT No.: PCT/JP2009/006658
§ 371 (c)(1),
(2), (4) Date: Jun. 8, 2011

(87) PCT Pub. No.: WO2010/067570
PCT Pub. Date: Jun. 17, 2010

(65) Prior Publication Data
US 2011/0247107 A1    Oct. 6, 2011

(30) Foreign Application Priority Data
Dec. 10, 2008    (JP) .................. 2008-314113

(51) Int. Cl.
*G01Q 20/02* (2010.01)
*G01B 11/30* (2006.01)
*G01B 5/28* (2006.01)

(52) U.S. Cl. ........... 850/4; 850/6; 250/306; 250/307; 356/600; 73/105

(58) Field of Classification Search .......... 250/306, 250/307; 850/1–6, 52, 53, 62, 63; 73/1.56, 73/104, 105; 356/600
See application file for complete search history.

(56) References Cited

U.S. PATENT DOCUMENTS
6,708,556 B1    3/2004    Kim et al.
(Continued)

FOREIGN PATENT DOCUMENTS
JP    06-102038 A    4/1994
(Continued)

OTHER PUBLICATIONS
International Search Report of PCT/JP2009/006658, mail date of Feb. 23, 2010.
(Continued)

*Primary Examiner* — Bernard E Souw
(74) *Attorney, Agent, or Firm* — Westerman, Hattori, Daniels & Adrian, LLP

(57) ABSTRACT

Incident light 19 emitted from a laser light source 18 is reflected on an upper surface of a cantilever 13, so that reflected light 19a enters light detection means 20. Since the incident light 19 and the reflected light 19a are in a plane not including a long axis of the cantilever 13, movements of the reflected light 19a due to change in a deflection amount θ of the cantilever 13 and due to change in a fine vertical movement amount z thereof are different in direction on the light detection means 20. This enables the change in the deflection amount θ of the cantilever 13 and the change in the fine vertical movement amount z thereof to be separated from output of the light detection means 20.

7 Claims, 5 Drawing Sheets

Front view

Side view

U.S. PATENT DOCUMENTS

| | | | |
|---|---|---|---|
| 6,776,030 B1 * | 8/2004 | Kirpichnikov et al. | 73/105 |
| 7,614,288 B2 * | 11/2009 | Iyoki et al. | 73/105 |
| 2008/0061232 A1 * | 3/2008 | Iyoki et al. | 250/306 |
| 2008/0266575 A1 | 10/2008 | Gaitas et al. | |
| 2009/0158828 A1 * | 6/2009 | Baba et al. | 73/105 |
| 2011/0035848 A1 * | 2/2011 | Perkins et al. | 850/3 |

FOREIGN PATENT DOCUMENTS

| | | |
|---|---|---|
| JP | 07-280818 A | 10/1995 |
| JP | 07-301516 A | 11/1995 |
| JP | 2003-501647 A | 1/2003 |
| JP | 2004-069445 A | 3/2004 |
| JP | 2010-014591 A | 1/2010 |

OTHER PUBLICATIONS

Joonhyung Kwon, et al; "Atomic Force Microscope with Improved Scan Accuracy, Scan Speed, and Optical Vision", Review of Scientific Instruments, 2003 American Institute of Physics, Oct. 2003, pp. 4378-4383, vol. 74, No. 10.

Notification of Transmittal of Translation of the International Preliminary Report on Patentability (Form PCT/IB/338) of International Application No. PCT/JP2009/006658 mailed Jun. 16, 2011 with Forms PCT/IPEA/409.

* cited by examiner

FIG.1

Front view          Side view

PRIOR ART

FIG.4(b)

PRIOR ART

FIG.4(c)

PRIOR ART

PRIOR ART

METHOD FOR PROCESSING OUTPUT OF SCANNING TYPE PROBE MICROSCOPE, AND SCANNING TYPE PROBE MICROSCOPE

BACKGROUND OF THE INVENTION

1. Field of the Invention

The present invention relates to a scanning type probe microscope, and particularly to a scanning type probe microscope in which a deflection amount of a cantilever is detected by an optical lever method and a probe finely moves vertically to control a distance between the probe and a sample.

2. Description of Related Art

A scanning type probe microscope is a device that brings a probe with a sharp fore-end closer to a sample to measure a force produced between the probe and the sample, by which a shape of a sample surface and the like are measured at an atomic level.

The scanning type prove microscope includes a so-called cantilever with a very small spring constant. The cantilever has a probe at a fore-end thereof. A fore-end of the probe is extremely sharp in the nm order. A deflection amount of the cantilever by atomic force acting between the probe and the sample surface is measured, while horizontally moving the sample or the probe for scanning. A base portion of the cantilever is fixed to a cantilever holding portion.

As operation modes of the scanning type probe microscope, a contact mode and a dynamic mode are known. In the contact mode, a fine vertical movement amount z of the sample is adjusted so as to make the force between the sample and the probe constant in the scanning. Accordingly, during the scanning, a deflection amount $\theta$ of the cantilever is constant. The sample surface shape can be known from output of the fine vertical movement amount z of the sample when the deflection amount $\theta$ of the cantilever is adjusted to be constant.

In the dynamic mode, the sample surface is scanned while constantly vibrating the probe. When the probe approaches the sample at an atomic level, an amplitude and a resonance frequency of the vibration of the probe are affected by attracting force or repulsive force by the sample, thereby being changed. Consequently, the fine vertical movement amount z of the sample is adjusted so as to make the amplitude or the resonance frequency of the probe constant. The sample surface shape can be known from the output of the fine vertical movement amount z of the sample.

Figure 4A:
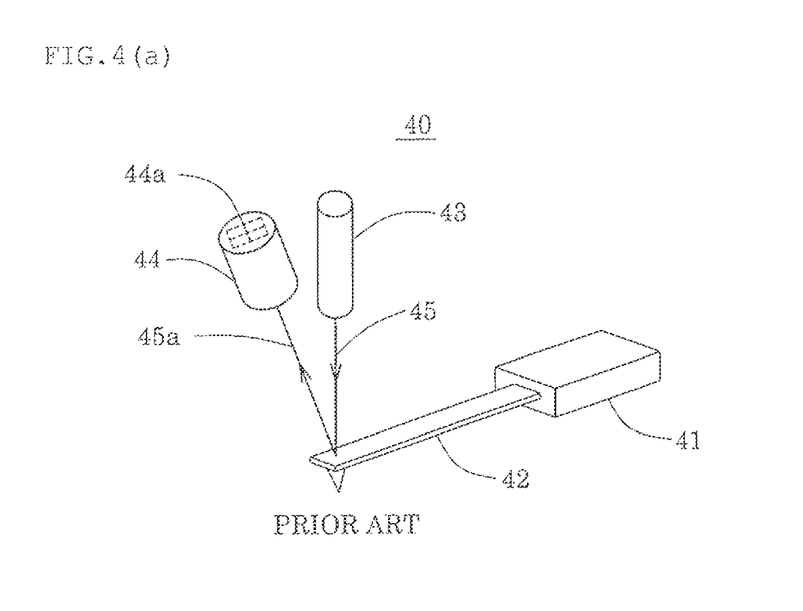
FIGS. 4(a) to 4(c) are schematic views of a conventional detection optical system by an optical lever method.

As means for measuring the deflection amount $\theta$ of the cantilever, a detection optical system by a method generally called optical lever method is used. In FIG. 4(a), one example of a detection optical system 40 by the conventional optical lever method is shown. A laser light source 43 and light detection means 44 are arranged in a plane including a long axis of a cantilever 42 above the cantilever 42 attached to a fore-end of a cantilever holding portion 41. The light detection means 44 is, for example, a quadrant photodiode.

Incident light 45 emitted from the laser light source 43 is reflected on an upper surface of the cantilever 42, so that reflected light 45a enters the light detection means 44. The light detection means 44 (the quadrant photodiode) has four light-receiving regions 44a. When the deflection amount $\theta$ of the cantilever 42 has a reference value, the reflected light 45a enters a center of the four light-receiving regions 44a.

Figure 4B:
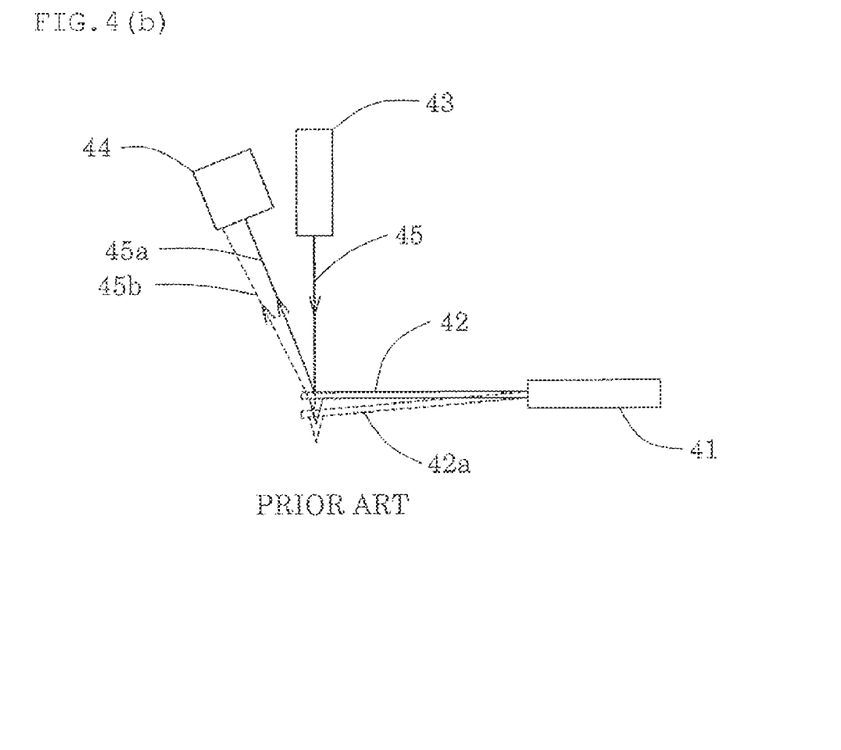

As shown in FIG. 4(b), when deflection occurs in the cantilever 42, thereby changing as shown by a cantilever 42a indicated by dashed lines, the reflected light 45a moves from the center of the light detection means 44 as shown by reflected light 45b indicated by a dashed line. The four light-receiving regions 44a output voltages in accordance with received light intensity. Thus, when the reflected light 45a moves, differences are caused in the output voltage of the respective light-receiving regions 44a. From the caused differences in the output voltage, a movement amount of the reflected light 45b can be known, from which the deflection amount $\theta$ of the cantilever 42 can be known.

A detection sensitivity S in the detection optical system 40 by the optical lever method is given by $S=D/d=2L/K$, where a displacement of the reflected light 45b on the light detection means 44 is D, a length of the cantilever 42 is K, a light path length of the reflected light 45b is L, and a deflection displacement of the fore-end of the cantilever 42 is d. Here, for example, if $L=50$ mm, $K=100$ µm, then $S=1000$ is obtained. In this manner, the use of the detection optical system 40 by the optical lever method enables very highly-sensitive displacement detection to be performed with a simple configuration.

Figure 5:
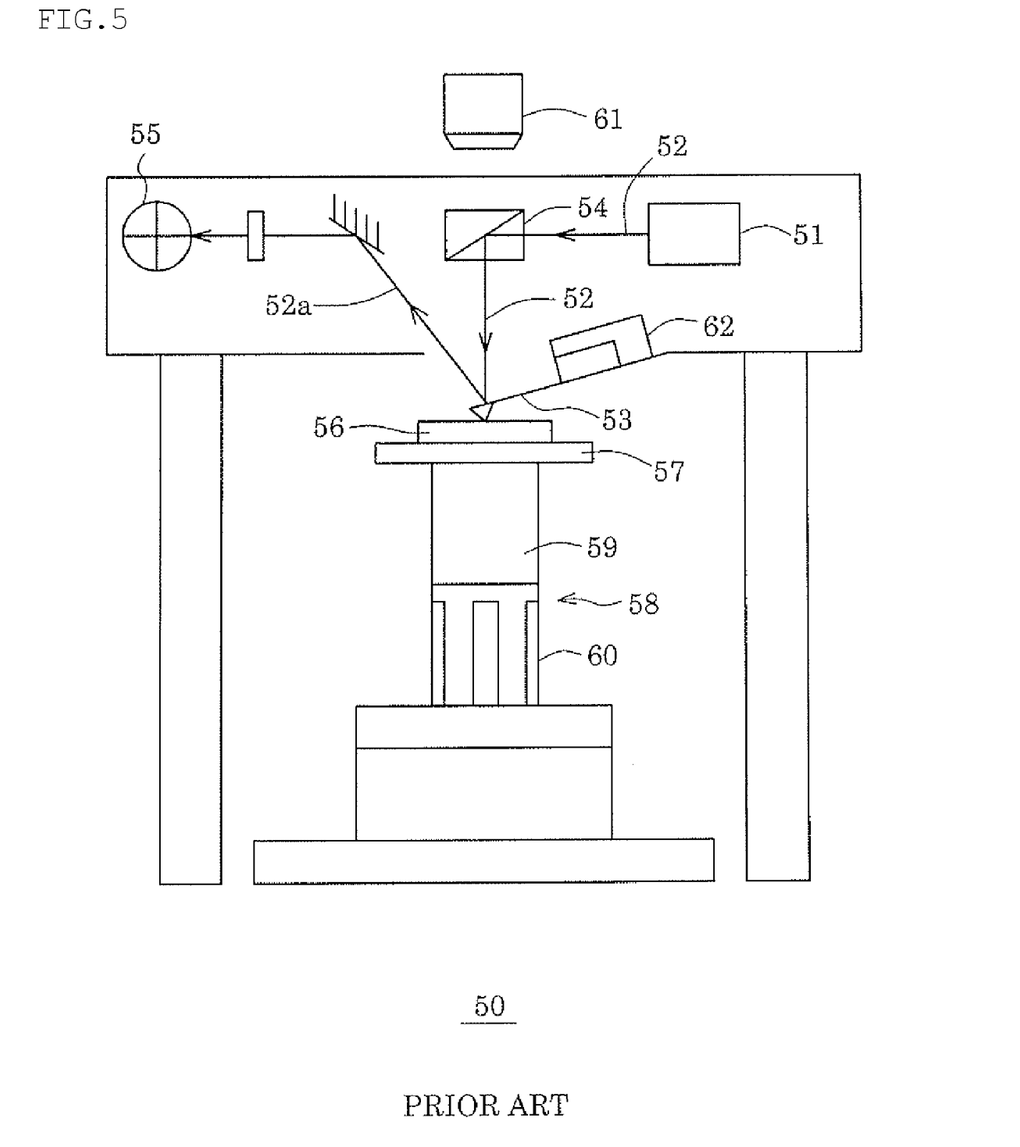
FIG. 5 is a schematic view of a conventional scanning type probe microscope.

FIG. 5 is one example of a scanning type prove microscope 50 by the optical lever method. Incident light 52 from a laser diode 51 is bent by a mirror 54 arranged immediately above the cantilever 53 to be applied to a cantilever 53. Reflected light 52a reflected at the cantilever 53 enters light detection means 55. The light detection means 55 is a quadrant photodiode.

A sample 56 is fixed on a sample holder 57, and the sample holder 57 is provided on a fine movement mechanism 58. For the fine movement mechanism 58, a piezoelectric element (piezo element) is ordinarily used. The fine movement mechanism 58 includes a fine vertical movement mechanism 59 to adjust a fine vertical movement amount of the sample 56 and a fine horizontal movement mechanism 60 to scan the sample 56 in a horizontal plane.

During the scanning of the sample 56, the fine vertical movement amount z of the sample 56 is adjusted by the fine vertical movement mechanism 59 so that the deflection amount $\theta$ of the cantilever 53 constantly has a reference value. The fine vertical movement mechanism 59 is operated by applying a voltage to the piezoelectric element. From the operation of the fine vertical movement mechanism 59, a surface shape of the sample 56 can be known. An optical microscope 61 enables the cantilever 53 and the sample 56 to be observed.

On the other hand, there is also a scanning type probe microscope having a structure in which the sample is fixed and the cantilever holding portion is finely moved vertically. This is used in the case where a large sample such as a semiconductor wafer is observed, or in the case where a plurality of cantilevers are driven independently. In this structure, a position of the reflected light on the light detection means is affected not only by the deflection amount $\theta$ of the cantilever but also the fine vertical movement amount z thereof. Thus, in the measurement output, the effects by the deflection amount $\theta$ and the fine vertical movement amount z of the cantilever are included. Accordingly, accuracy and reliability of the surface shape of the sample by the output of the fine vertical movement amount z of the cantilever holding portion has a problem.

Figure 4C:
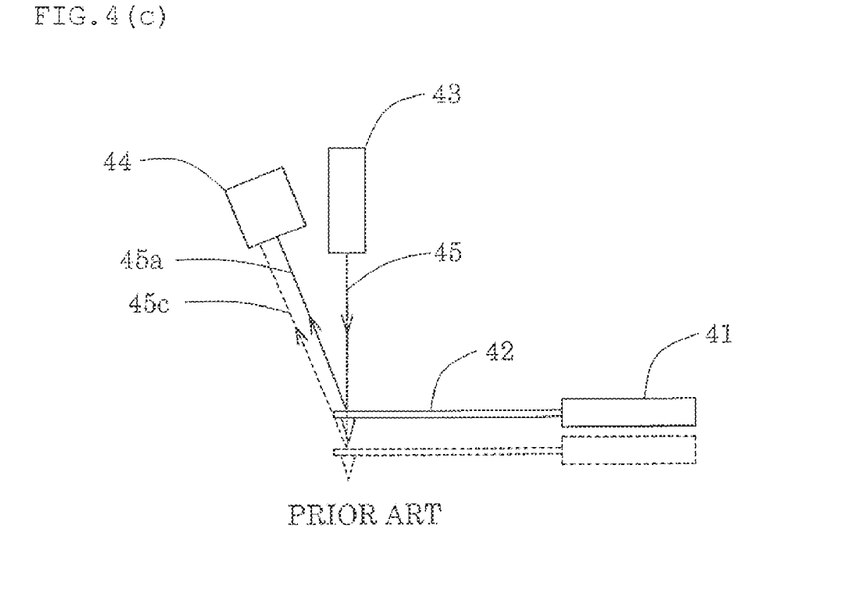

As shown by dashed lines in FIG. 4(c), the cantilever 42 may finely move vertically (in the fine vertical movement amount z). Although the deflection amount $\theta$ of the cantilever 42 does not change, the reflected light 45a entering the light detection means 44 moves as shown by reflected light 45c indicated by a dashed line. This movement is apparently the same as that when the deflection amount $\theta$ of the cantilever 42 changes as shown in FIG. 4(b). Thus, when the reflected light 45a moves on the light detection means 44, whether this movement is due to the change in the deflection amount θ of the cantilever 42 or due to the fine vertical movement amount z cannot be distinguished.

In the case of the dynamic mode, there is a method in which an output signal of the light detection means 44 is separated into an alternate current signal and a direct current signal, so that the alternate current signal is used for the control of the distance between the probe and the sample, and the direct current signal is imaged as a displacement amount of the fine vertical movement of the cantilever holding portion 41 (e.g., JP 2004-69445 A). This enables an effect by change in relative position between the cantilever holding portion 41 and the optical system to be eliminated, and since the actual displacement amount of the cantilever holding portion 41 is imaged, an error of the surface shape by hysteresis of a fine vertical movement element can be removed.

However, as in JP 2004-69445 A, the method for separating the output signal of the light detection means into the alternate current signal and the direct current signal is effective only in the dynamic mode, but is not available in the contact mode.

There is a method in which in order to increase measurement accuracy, a laser optical system and the light detection means are finely moved vertically in conjunction with the cantilever to thereby completely compensate for the fine vertical movement of the cantilever holding portion (Atomic forcemicroscope with improved scan accuracy, scan speed and optical vision (REVIEW OF SCIENTIFIC INSTRUMENTS, VOLUME 74, NUMBER 10, OCTOBER 2003). However, in this method, a mechanism is very complicated and thus, not general.

SUMMARY OF THE INVENTION

In the scanning type probe microscope by the method of finely moving the cantilever vertically, the reflected light on the light detection means is affected not only by the deflection amount θ of the cantilever but also by the fine vertical movement amount z thereof. However, conventionally, the effects by the deflection amount θ and the fine vertical movement amount z have not been able to be separated from the output of the measurement means. This has resulted in a problem with accuracy and reliability of the measurement result. An object of the present invention is to provide a method for separating effects by the deflection amount θ and the fine vertical movement amount z of a cantilever from measurement output to establish accuracy and reliability of a measurement result, in a scanning type prove microscope in which a sample is fixed and the cantilever is finely moved vertically.

In a scanning type probe microscope of the present invention, a cantilever is cantilevered by a cantilever holding portion, and the cantilever holding portion is three-dimensionally driven by a fine vertical movement mechanism and a horizontal scanning mechanism. Incident light emitted form a laser light source is reflected on an upper surface of the cantilever, so that reflected light enters light detection means. The incident light and the reflected light are in a plane not including a long axis of the cantilever. Since the incident light and the reflected light are in the plane not including the long axis of the cantilever, movement of the reflected light due to change in a deflection amount θ of the cantilever and movement of the reflected light due to change in a fine vertical movement amount z are different in direction on the light detection means. This enables the change in the deflection amount θ of the cantilever and the change in the fine vertical movement amount z thereof to be separated from output of the light detection means.

The summary of the present invention is as follows:

In a first preferred embodiment, a method for processing output of a scanning type probe microscope according to the present invention is a method for processing output of a scanning type probe microscope including a cantilever having a probe at a fore-end thereof, a laser light source that applies incident light to the cantilever, light detection means for detecting reflected light by the cantilever, and fine vertical movement means of the cantilever, wherein the incident light and the reflected light are in a plane not including a long axis of the cantilever, and the probe is caused to scan while controlling a fine vertical movement amount of the cantilever by the fine vertical movement means, the method including decomposing output of the light detection means into a deflection amount and the fine vertical movement amount of the cantilever by arithmetic operation.

In a second preferred embodiment of the method for processing the output of the scanning type probe microscope according to the present invention, assuming that the deflection amount of the cantilever is θ, and the fine vertical movement amount thereof is z, a position of the reflected light on the light detection means is (X, Y), and A, B, C, D are constants specific to the scanning type probe microscope, a relationship between (X, Y) and (θ, z) is as follows;

$$X = A\theta + Bz \quad (1)$$

$$Y = C\theta + Dz \quad (2)$$

from the expressions (1), (2), the following expressions (3), (4) are found;

$$Y - (D/B)X = (C - AD/B)\theta \quad (3)$$

$$X - (A/C)Y = (B - AD/C)z \quad (4)$$

and from the position (X, Y) of the reflected light on the light detection means, the deflection amount θ and the fine vertical movement amount z of the cantilever are found, using the expressions (3), (4).

In a third preferred embodiment of the method for processing the output of the scanning type probe microscope according to the present invention, the fine vertical movement amount z of the cantilever holding portion is changed while maintaining the deflection amount of the cantilever θ=0 to thereby decide a value of D/B so that a right side of the expression (3) becomes 0, and the deflection amount θ of the cantilever is changed while maintaining the fine vertical movement amount of the cantilever holding portion z=0 to thereby decide a value of A/C so that a right side of the expression (4) is 0.

In a fourth preferred embodiment of the method for processing the output of the scanning type probe microscope according to the present invention, the fine vertical movement amount z of the cantilever is controlled so as to make the deflection amount θ in the expression (3) constant, and the fine vertical movement amount z obtained from the expression (4) is imaged.

In a fifth preferred embodiment, a method for processing output of a scanning type probe microscope according to the present invention is a method for processing output of a scanning type probe microscope including a cantilever having a probe at a fore-end thereof, a laser light source that applies incident light to the cantilever, a quadrant photodiode as light detection means for detecting reflected light by the cantilever, and fine vertical movement means of the cantilever, wherein the incident light and the reflected light are in a plane not including a long axis of the cantilever, and the probe is caused to scan while controlling a fine vertical movement amount of the cantilever by the fine movement means, the method including matching a border of light-receiving regions of the quadrant photodiode and a movement direction of the reflected light by deflection or fine vertical movement of the cantilever, and calculating a deflection amount $\theta$ or a fine vertical movement amount z of the cantilever from output of the quadrant photodiode.

In a sixth preferred embodiment of a scanning type probe microscope according to the present invention, a fine vertical movement amount z of a cantilever obtained using the aforementioned method for processing the output is imaged.

In a seventh preferred embodiment, the scanning type probe microscope according to the present invention includes the cantilever and light detection means plurally.

ADVANTAGE OF THE INVENTION

According to the present invention, there is provided a method for separating the deflection amount $\theta$ and the fine vertical movement amount z of the cantilever from the output of the measurement means by the simple method in the scanning type probe microscope that finely moves the cantilever vertically, which establishes the accuracy and the reliability of the measurement result.

DESCRIPTION OF THE PREFERRED EMBODIMENTS

Figure 1:
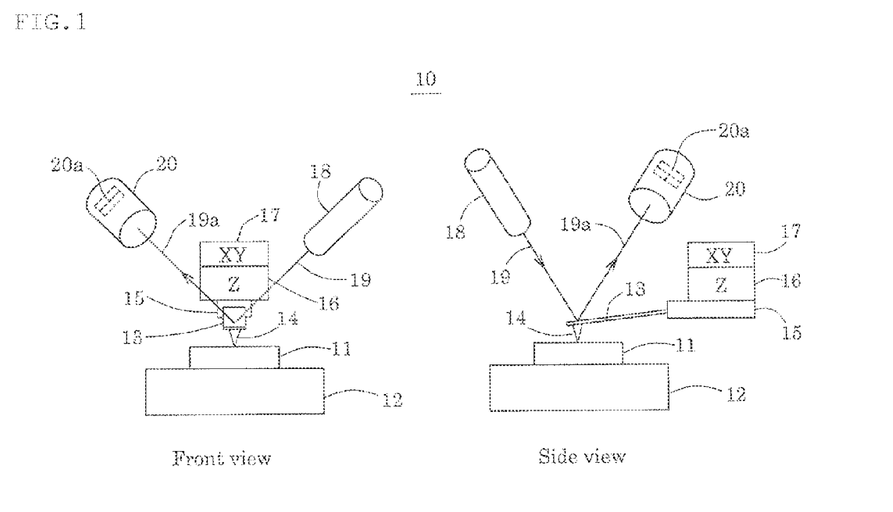
FIG. 1 is a front view and a side view of a scanning type probe microscope of the present invention.

FIG. 1 is a front view and a side view of a major portion of one embodiment of a scanning type probe microscope 10 of the present invention. A sample 11 is placed on a sample table 12. The sample table 12 is an XY stage, which is used to roughly move the sample 11 when an observation position of the sample 11 is selected. The sample table 12 is fixed when the sample 11 is measured. A probe 14 at a fore-end of a cantilever 13 comes into contact with a surface of the sample 11 placed on the sample table 12. The cantilever 13 is cantilevered by a cantilever holding portion 15. The cantilever holding portion 15 is three-dimensionally driven by a fine vertical movement mechanism 16 and a horizontal scanning mechanism 17. Incident light 19 emitted from a laser light source 18 is reflected on an upper surface of the cantilever 13, and reflected light 19a enters light detection means 20. The incident light 19 and the reflected light 19a are in a plane not including a long axis of the cantilever 13. If the incident light 19 and the reflected light 19a are in the plane including the long axis of the cantilever 13, directions of the movements of the reflected light 19a due to change in a deflection amount $\theta$ and change in a fine vertical movement amount z of the cantilever 13 are the same on the light detection means 20. In this case, the change in the deflection amount $\theta$ of the cantilever 13 and the change in the fine vertical movement amount z thereof cannot be separated from the output of the light detection means 20. Therefore, the incident light 19 and the reflected light 19a are in the plane not including the long axis of the cantilever 13.

Since the incident light 19 and the reflected light 19a are in the plane not including the long axis of the cantilever 13, it is also easy to install an optical microscope (not shown) immediately above the cantilever 13. Since the installation of the optical microscope enables the cantilever 13, the probe 14, and the sample 11 to be magnified and observed, the specifying of scanning position becomes easy.

In the measurement, a height of the probe 14 is set to a position where a fore-end of the probe 14 and the sample 11 have no contact with each other, while observing the sample 11 and the probe 14 with the optical microscope. The incident light 19 is applied to the upper surface of the cantilever 13 so that the reflected light 19a is caused to enter the light detection means 20 (e.g., a quadrant photodiode 20a), and adjustment is made so that the reflected light 19a comes to a center of the light detection means 20. In other words, when no external force is applied to the cantilever 13, the reflected light 19a comes to the center of the light detection means 20. The deflection amount $\theta$ of the cantilever 13 at this time is a reference value ($\theta$=0). In the case where the light detection means 20 is the quadrant photodiode 20a, outputs of four light-receiving regions are equal when the reflected light 19a is at the center of the quadrant photodiode 20a.

That is, when the deflection amount of the cantilever 13 $\theta$=0, and the fine vertical movement amount of the cantilever holding portion 15 z=0, the reflected light 19a comes to the center of the light detection means 20 (the quadrant photodiode 20a).

Figure 2:
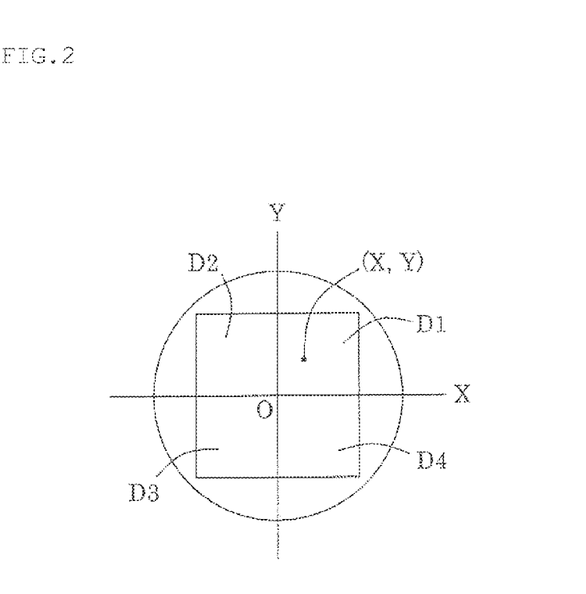
FIG. 2 is a schematic view of a quadrant photodiode as light detection means.

FIG. 2 is a schematic view of a light-receiving surface of the light detection means 20 (the quadrant photodiode 20a), in which D1 to D4 are the four light-receiving regions. The center is an origin O, and an X axis and a Y axis, which are orthogonal to each other, are borders of the respective light-receiving regions D1 to D4. When the deflection amount of the cantilever 13 $\theta$=0, and the fine vertical movement amount of the cantilever holding portion 15 z=0, a position of the reflected light 19a is X=0, Y=0. When the deflection amount $\theta$ and the fine vertical movement amount z of the cantilever 13 are ($\theta$, z), the position of the reflected light 19a of the light-receiving regions D1 to D4 is (X, Y).

The position (X, Y) of the reflected light 19a is actually obtained as output of the following electric signals.

$X$=(output of $D1$)+(output of $D4$)−(output of $D2$)−(output of $D3$)

$Y$=(output of $D1$)+(output of $D2$)−(output of $D3$)−(output of $D4$)

Next, an effect on the movement of the reflected light 19a on the light detection means 20 (the quadrant photodiode 20a) by an angle formed by the plane to which the incident light 19 and the reflected light 19a belong, and the long axis of the cantilever 13 will be described.

Figure 3A:
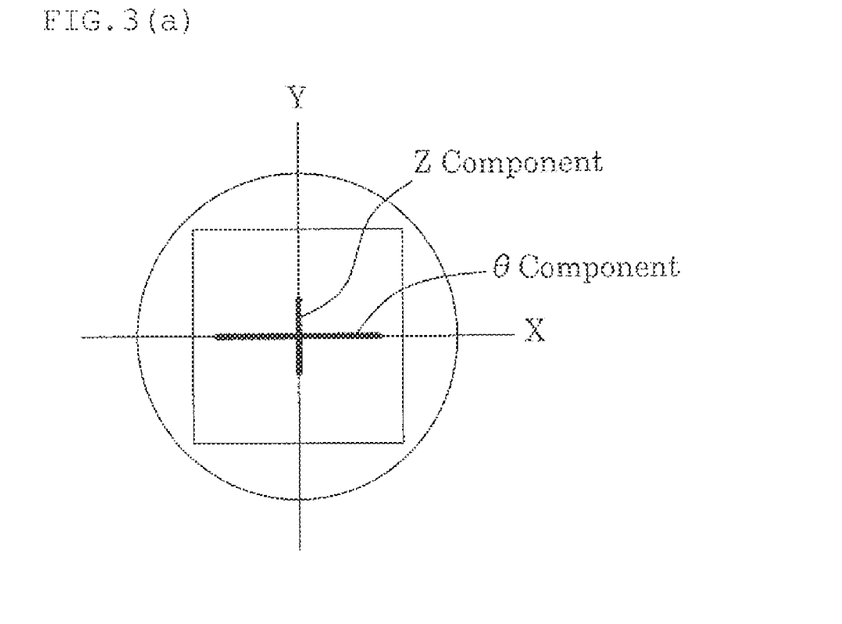
FIGS. 3(a) to 3(c) are schematic views of a θ component and a z component on the light detection means.

When the plane to which the incident light 19 and the reflected light 19a belong, and the long axis of the cantilever 13 cross at right angles, a $\theta$ component corresponding to the deflection amount and a z component corresponding to the fine vertical movement amount are orthogonal. When the $\theta$ component and the z component are orthogonal, by appropriately rotating the light detection means 20 (the quadrant photodiode 20a), the $\theta$ component appears on the X axis, and the z component appears on the Y axis as shown in FIG. 3($a$). In this case, the $\theta$ component and the z component can be directly found simultaneously without particularly performing arithmetic operation.

Figure 3B:
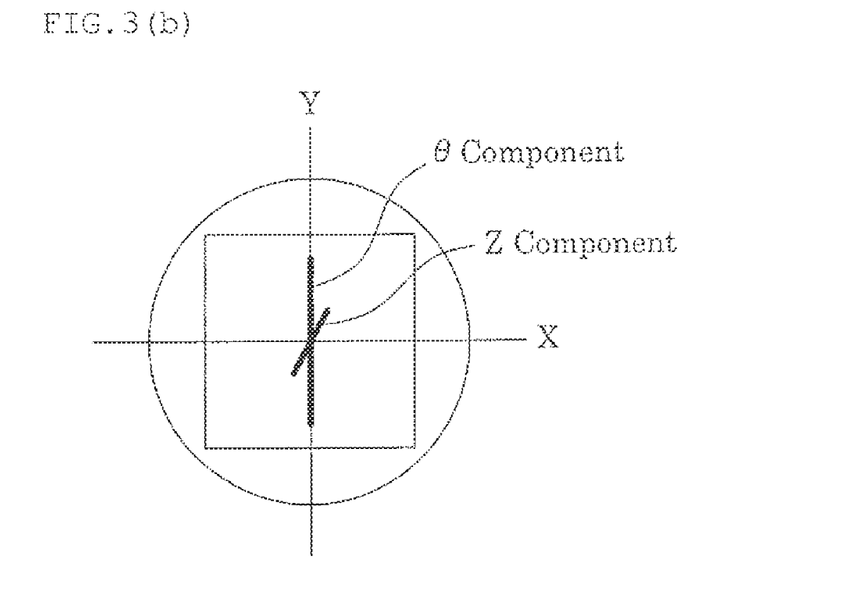
Figure 3C:
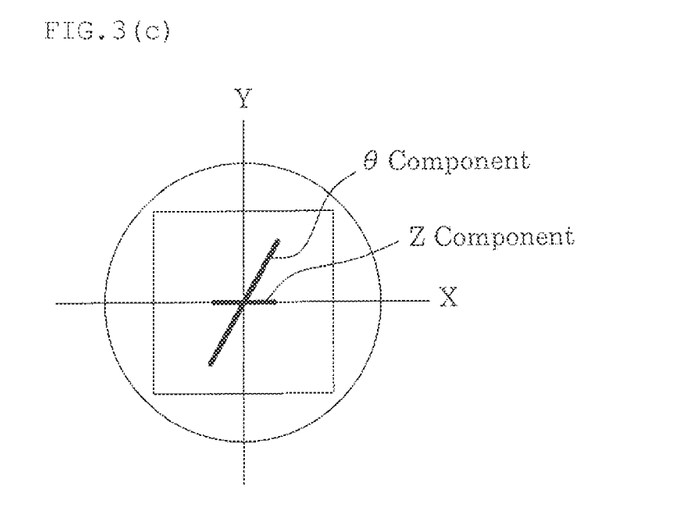

When the plane to which the incident light 19 and the reflected light 19a belong, and the long axis of the cantilever 13 cross obliquely, the $\theta$ component and the z component are not orthogonal (they cross obliquely). When the $\theta$ component and the z component cross obliquely, rotating the light detection means 20 (the quadrant photodiode 20a) at an appropriate angle allows the $\theta$ component to disappear on the X axis, as shown in FIG. 3($b$). At this time, an X signal may be used as a z signal, and arithmetic operation is not particularly needed. Moreover, appropriately rotating the light detection means 20 (the quadrant photodiode 20a) at another angle allows the z component to disappear on the Y axis, as shown in FIG. 3(c). At this time, a Y signal may be used as the θ signal, and arithmetic operation is not particularly needed. However, in the case of the FIGS. 3(b) and 3(c), the following arithmetic operation is needed to simultaneously calculate the θ component and the z component.

When the deflection amount of the cantilever 13 is θ and the fine vertical movement amount is z, the position (X, Y) of the reflected light 19a on the quadrant photodiode 20a is approximately expressed as follows:

$$X = A\theta + Bz \quad (1)$$

$$Y = C\theta + Dz \quad (2)$$

where A, B, C D are constants decided in accordance with the configuration of the device (the scanning type probe microscope).

The following expressions (3), (4) are derived from the expressions (1), (2).

$$Y - (D/B)X = (C - AD/B)\theta \quad (3)$$

$$X - (A/C)Y = (B - AD/C)z \quad (4)$$

Since a right side of the expression (3) is a constant●θ, and a right side of the expression (4) is a constant●z, calculating left sides of the expressions (3), (4) from the outputs of X, Y enables the deflection amount θ and the fine vertical movement amount z to be independently found.

With the cantilever 13 not vibrated (with the deflection amount θ=0 maintained), the fine vertical movement amount of the cantilever holding portion 15 is changed (the fine vertical movement amount z≠0). At this time, a value of D/B is decided so that an output signal (θ signal) corresponding to the right side of the expression (3) becomes 0. Next, with the fine vertical movement of the cantilever holding portion 15 stopped (with the fine vertical movement amount z=0 maintained), the cantilever 13 is vibrated (the deflection amount θ≠0). At this time, a value of A/C is decided so that an output signal (z signal) corresponding to the right side of the expression (4) becomes 0. In the above procedure, although individual values of A, B, C, D are not known, the value of D/B and the value of A/C can be decided.

Next, a target value of the deflection amount θ of the cantilever 13 is decided, and the probe 14 is brought closer to the sample 11 until the θ signal reaches the value equivalent to this. Corresponding values of the deflection amount θ and the θ signal are found in advance by thermal vibration noise measurement or the like.

In this state, the cantilever 13 is horizontally moved to perform the scanning of the sample 11. The deflection amount θ of the cantilever 13 changes in accordance with unevenness of the surface of the sample 11, so that the output of the light detection means 20 (the quadrant photodiode) changes. At this time, the fine vertical movement amount z of the cantilever holding portion 15 is controlled so as to make the θ signal constant in the expression (3) (corresponding to the deflection amount θ of the cantilever 13).

The value of the fine vertical movement amount z of the cantilever holding portion 15 accompanying the above-described control corresponds to the unevenness of the surface of the sample 11 in a conventional scanning type probe microscope. Actually, since the fine vertical movement amount z of the cantilever holding portion 15 cannot be found directly, by conversion from the voltage applied to the piezoelectric element of the fine vertical movement mechanism 16, the fine vertical movement amount z of the cantilever holding portion 15 is obtained. That is, by imaging a voltage control signal inputted to the fine vertical movement mechanism 16, the surface shape of the sample 11 is obtained. However, it is generally known that the fine vertical movement mechanism 16 has an error due to nonlinearity, hysteresis and the like, and an obtained surface shape image contains this error.

On the other hand, the signal of the fine vertical movement amount z obtained from the expression (4) by the above-described scanning results from detecting the actual fine vertical movement amount z of the cantilever 13. By imaging the signal of the fine vertical movement amount z from this output, a surface shape image can be obtained. This surface shape image is not affected by the error of the fine vertical movement mechanism 16. Accordingly, the surface shape image obtained by imaging the signal of the fine vertical movement amount z obtained from the expression (4) has higher accuracy than the surface shape image obtained by imaging the voltage control signal inputted to the fine vertical movement mechanism 16.

DESCRIPTION OF THE SYMBOLS 10 scanning type probe microscope
11 sample
12 sample table
13 cantilever
14 probe
15 cantilever holding portion
16 fine vertical movement mechanism
17 horizontal scanning mechanism
18 laser light source
19 incident light
19a reflected light
20 light detection means
20a quadrant photodiode
40 detection optical system
41 cantilever holding portion
42 cantilever
42a cantilever
43 laser light source
44 light detection means
44a light-receiving region
45 incident light
45a reflected light
45b reflected light
45c reflected light
50 scanning type probe microscope
51 laser diode
52 incident light
52a reflected light
53 cantilever
54 mirror
55 light detection means 56 sample
57 sample holder
58 fine movement mechanism
59 fine vertical movement mechanism
60 fine horizontal movement mechanism
61 optical microscope

What is claimed is:

1. A method for processing output of a scanning type probe microscope comprising:
 a cantilever having a probe at a fore-end thereof;
 a laser light source that applies incident light to the cantilever;
 light detection means for detecting reflected light by the cantilever; and
 fine vertical movement means of the cantilever,
wherein assuming that the deflection amount of the cantilever is θ, and the fine vertical movement amount thereof is z, a position of the reflected light on the light detection means is (X, Y), and A, B, C, D are constants specific to the scanning type probe microscope, a relationship between (X, Y) and (θ, z) is as follows;

$$X = A\theta + Bz \quad (1)$$

$$Y = C\theta + Dz \quad (2)$$

from the expressions (1), (2), the following expressions (3), (4) are found;

$$Y - (D/B)X = (C - AD/B)\theta \quad (3)$$

$$X - (A/C)Y = (B - AD/C)z \quad (4)$$

and
 from the position (X, Y) of the reflected light on the light detection means, the deflection amount θ and the fine vertical movement amount z of the cantilever are found, using the expressions (3), (4).

2. The method according to claim 1, wherein the fine vertical movement amount z of a cantilever holding portion is changed while maintaining the deflection amount of the cantilever θ=0 to thereby decide a value of D/B so that a right side of the expression (3) becomes 0, and the deflection amount θ of the cantilever is changed while maintaining the fine vertical movement amount of the cantilever holding portion z=0 to thereby decide a value of A/C so that a right side of the expression (4) is 0.

3. The method according to claim 1, wherein the fine vertical movement amount z of the cantilever is controlled so as to make the deflection amount θ in the expression (3) constant, and the fine vertical movement amount z obtained from the expression (4) is imaged.

4. A method for processing output of a scanning type probe microscope comprising:
 a cantilever having a probe at a fore-end thereof;
 a laser light source that applies incident light to the cantilever;
 a quadrant photodiode as light detection means for detecting reflected light by the cantilever; and
 fine vertical movement means of the cantilever,
wherein the incident light and the reflected light are in a plane not including a long axis of the cantilever, and
the probe is caused to scan while controlling a fine vertical movement amount of the cantilever by the fine movement means,
the method comprising the steps of:
matching a border of light-receiving regions of the quadrant photodiode and a movement direction of the reflected light by deflection or fine vertical movement of the cantilever; and
calculating a deflection amount θ or a fine vertical movement amount z of the cantilever from output of the quadrant photodiode.

5. A scanning type probe microscope, wherein a fine vertical movement amount z of a cantilever obtained using the method for processing the output according to any one of claims 1, 2, 3, 4 is imaged.

6. The scanning type probe microscope according to claim 5, comprising the cantilever and light detection means plurally.

7. The method according to claim 2, wherein the fine vertical movement amount z of the cantilever is controlled so as to make the deflection amount θ in the expression (3) constant, and the fine vertical movement amount z obtained from the expression (4) is imaged.

* * * * *